US011144326B2

(12) United States Patent
Manjunatha et al.

(10) Patent No.: US 11,144,326 B2
(45) Date of Patent: Oct. 12, 2021

(54) SYSTEM AND METHOD OF INITIATING MULTIPLE ADAPTORS IN PARALLEL

(71) Applicant: Cisco Technology, Inc., San Jose, CA (US)

(72) Inventors: Paniraja Koppa Manjunatha, Fremont, CA (US); Payal Bhaduri, Santa Clara, CA (US); Hari Khanal, San Jose, CA (US); Santosh Ramrao Patil, Santa Clara, CA (US); Ganesh Kumar A., Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 243 days.

(21) Appl. No.: 16/279,217

(22) Filed: Feb. 19, 2019

(65) Prior Publication Data

US 2020/0264893 A1    Aug. 20, 2020

(51) Int. Cl.
*G06F 9/4401*    (2018.01)

(52) U.S. Cl.
CPC .......... *G06F 9/4401* (2013.01); *G06F 9/4408* (2013.01); *G06F 9/4411* (2013.01)

(58) Field of Classification Search
CPC ..... G06F 9/4401; G06F 9/4411; G06F 9/4408
See application file for complete search history.

(56) References Cited

U.S. PATENT DOCUMENTS

| 7,181,608 | B2 | 2/2007 | Fallon et al. |
| 7,181,609 | B2 | 2/2007 | Connor et al. |
| 8,499,143 | B2 | 7/2013 | Itoh et al. |
| 9,003,175 | B2 | 4/2015 | Mese et al. |
| 2005/0038981 | A1* | 2/2005 | Connor ................. G06F 9/4411 713/1 |
| 2006/0136653 | A1* | 6/2006 | Traut .................... G06F 9/4406 711/6 |
| 2007/0233967 | A1* | 10/2007 | Rangarajan ......... G06F 12/0806 711/147 |
| 2008/0040525 | A1* | 2/2008 | Lin ....................... G06F 13/385 710/302 |
| 2013/0080754 | A1* | 3/2013 | Ganesh ................ G06F 9/4403 713/2 |

FOREIGN PATENT DOCUMENTS

CN             102214105         5/2017

\* cited by examiner

*Primary Examiner* — Jaweed A Abbaszadeh
*Assistant Examiner* — Gayathri Sampath
(74) *Attorney, Agent, or Firm* — Polsinelli

(57) ABSTRACT

Systems, methods, and computer-readable storage media are provided for parallel initiating of devices in a system. The method includes generating an affinity table that stores option ROM execution data including first data associated with a first device and second data associated with a second device and triggering, based on the affinity table, a first initialization of the first device and executing a first option ROM code during a pre-boot phase and triggering, based on the affinity table, a second initialization of the second device and executing a second option ROM code during the pre-boot phase. Triggering the first initialization of the first device and triggering the second initialization of the second device during the pre-boot phase is performed such that at least a part of the first initialization of the first device and at least part of the second initialization of the second device are executed in parallel.

20 Claims, 3 Drawing Sheets

SYSTEM AND METHOD OF INITIATING MULTIPLE ADAPTORS IN PARALLEL

TECHNICAL FIELD

The present technology pertains to triggering an initialization of multiple devices or adapters in a computing system in parallel in a booting phase.

BACKGROUND

Typical computer systems use specific computer firmware during the booting process to recognize, initialize, and test the hardware present in the given computer system, and load a boot loader or operating system (OS). Firmware platforms, such as basic input/output system (BIOS) or unified extensible firmware interface (UEFI), provide an interface that allows a variety of different parameters to be set, such as hardware and booting configuration parameters. For example, a firmware interface may be used to specify clock and bus speeds, indicate what peripherals are attached to the computer system, configure specific monitoring procedures, and set a variety of other parameters that affect performance and power usage of the computer system.

The firmware of a computer system is typically stored in flash memory, such as non-volatile random access memory (NVRAM), read-only memory (ROM), or electrically erasable programmable read-only memory (EEPROM). The flash memory allows the firmware and firmware configurations to be rewritten without removing the memory chip from the computer device.

In current data center implementations, the servers may have multiple PCIe-based adapters for iSCSI (Internet Small Computer Systems Interface), FC (FACET Card or Fiber Channel), FCoE (Fiber Channel over Ethernet), Infiniband (A networking communications standard for high-performance computing that features very high throughput and low latency), PXE (Preboot Execution Environment—an industry standard client/server interface that allows networked computers that are not yet loaded with an operating system to be configured and booted remotely by the administrator), etc. A PCIe-based adapter is a peripheral component interconnect express that is an interface standard for connecting high-speed components. Every desktop PC motherboard, server, network device, and so forth, has a number of PCIe slots that can be used to add GPUs (also known as video cards or graphics cards), RAID cards, Wi-Fi cards or SSD (solid-state drive) add-on cards. The iSCSI is an IP-based storage networking standard for linking data storage facilities. It can provide a block level access to storage devices by carrying SCSI commands over a TCP/IP network.

The system has to undergo executing option ROM (OPROM) of each of these adapters if it is configured to do so. This entire execution, a sequential process, and the total boot time depend on the number of adapters present in the system. A typical boot from a SAN (storage area network) works as will now be described. When the administrator sets up the host to boot from a SAN, the boot image is not stored on the ESX (enterprise-class, type-1 hypervisors developed by VMWare or the like for deploying and serving virtual computers) host's local disk, but instead is stored on a SAN LUN (logical units, or a unique identifier given to separate devices). The host is informed about the boot image location. When the host is started, it boots from the LUNs on the SAN array.

Typically, the server powers on and the BIOS initializes. Next, the server executes the OPROM for each adapter and each device initializes in BIOS. The BIOS post boots through the HBA (host bus adapter) to update the iSCSI Boot firmware Table (iBFT) in the case of iSCSI, PXE, etc. Then the system boots for LUN/Network boot, etc.

It is very common that servers will have multiple PCIe adapters. In this scenario, the server has to go through the OPROM execution of each of these adapters sequentially. Hence, even though the LUN required to boot through OS (operating system) is available, initialization of other adapters takes a significant amount of time. Similar challenges are present in normal networking device (switches, routers) boot up. In some processes, the boot up of devices like switches and routers will take a significant amount of time (even 20-30 minutes) due to the sequential process of initialization through firmware and OS layers.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Disclosed are systems, methods, and non-transitory computer-readable storage media for enabling a mechanism for accelerating the booting of servers and other network devices by performing a pre-initialization of the co-processors, creating an affinity table, checking a type of boot and executing boot up activities in parallel so that the boot time remains constant no matter how many adapters are present.

A brief introductory description of example systems and environments for executing boot up activities in parallel are first disclosed herein. A detailed description of initialization process, the process of creating an affinity table, checking for a type of boot requirement and executing boot-up activities in parallel, will then follow. These variations shall be described herein as the various embodiments are set forth. The disclosure now turns to FIGS. 1A and 1B.

Figure 1A:
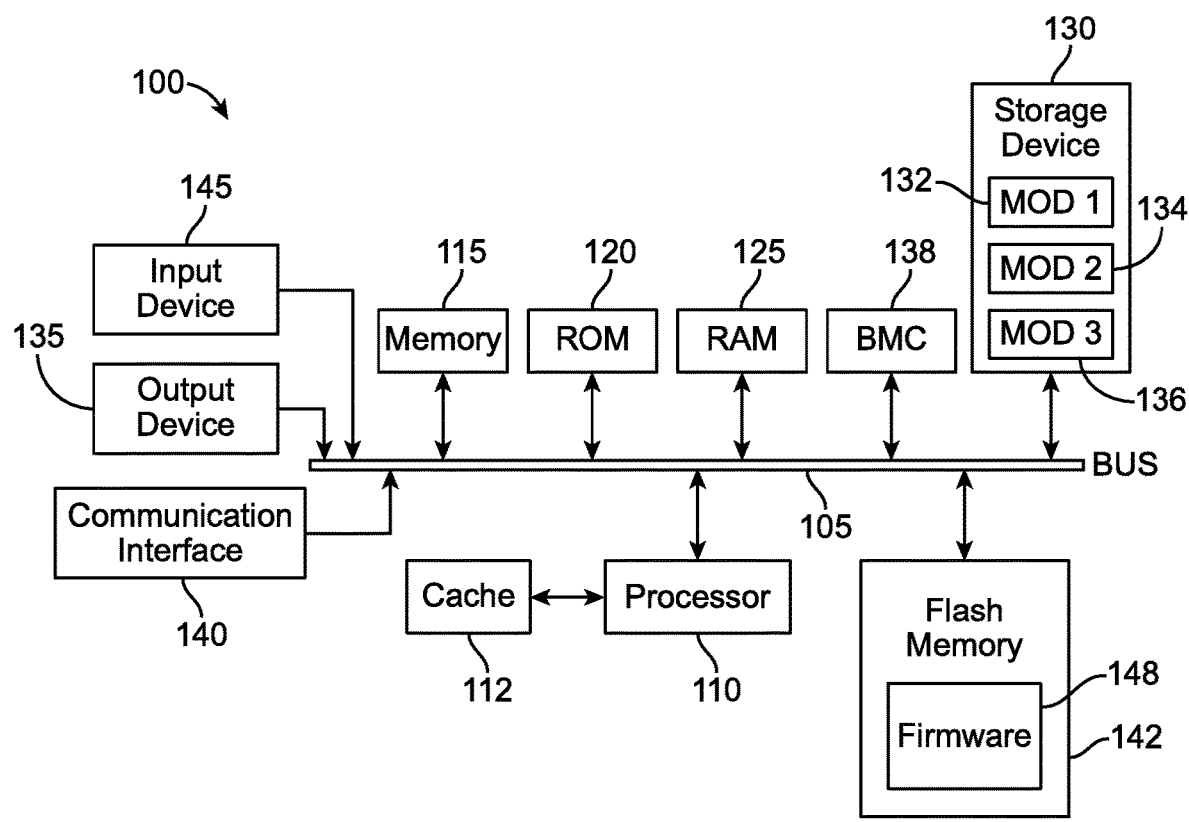
FIGS. 1A and 1B illustrate example system embodiments.
Figure 1B:
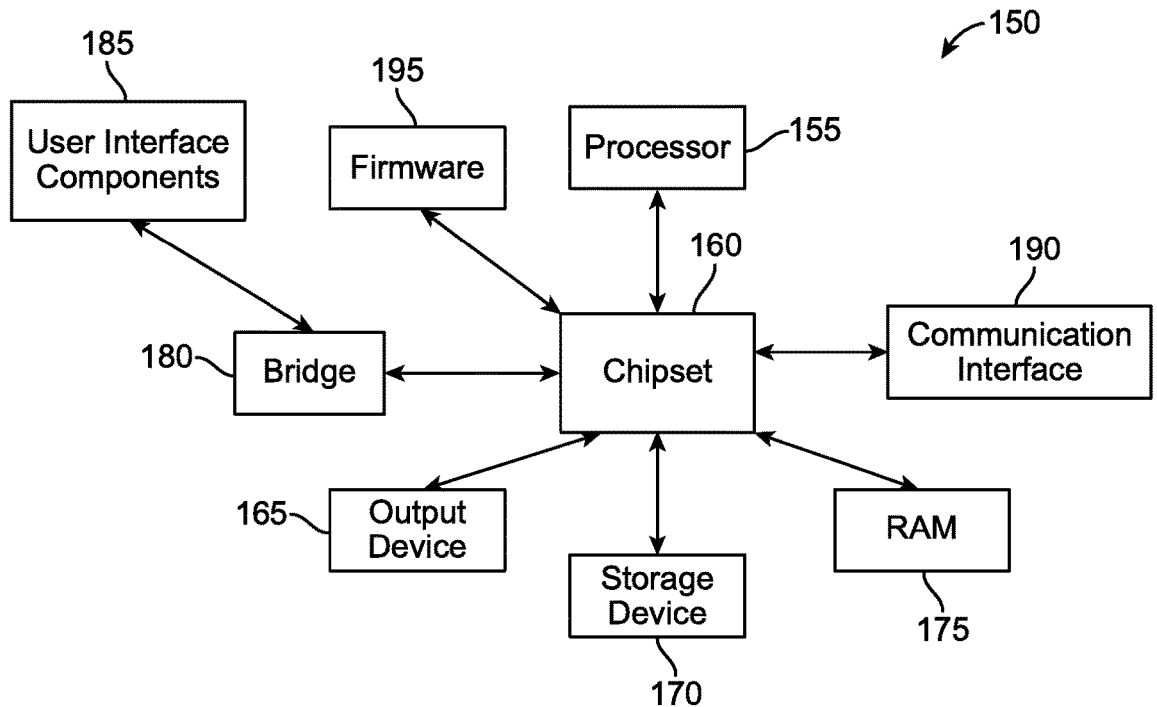

FIGS. 1A and 1B illustrate example system embodiments. The more appropriate embodiment will be apparent to those of ordinary skill in the art when practicing the present technology. Persons of ordinary skill in the art will also readily appreciate that other system embodiments are possible.

FIG. 1A illustrates a system bus computing system architecture 100 wherein the components of the system are in electrical communication with each other using a bus 105. Example system 100 includes a processing unit (CPU or processor) 110 and a system bus 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules can control or be configured to control the processor 110 to perform various actions. Other system memory 115 may be available for use as well. The memory 115 can include multiple different types of memory with different performance characteristics. The processor 110 can include any general purpose processor and a hardware module or software module, such as module 1 132, module 2 134, and module 3 136 stored in storage device 130, configured to control the processor 110 as well as a special-purpose processor where software instructions are incorporated into the actual processor design. The processor 110, 155, 210 may essentially be a completely self-contained computing system, containing multiple cores or processors, a bus, memory controller, cache, etc. A multi-core processor may be symmetric or asymmetric.

To enable user interaction with the computing device 100, an input device 145 can represent any number of input mechanisms, such as a microphone for speech, touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software modules 132, 134, 136 for controlling the processor 110. Other hardware or software modules are contemplated. The storage device 130 can be connected to the system bus 105. In one aspect, a hardware module that performs a particular function can include the software component stored in a computer-readable medium in connection with the necessary hardware components, such as the processor 110, bus 105, display 135, and so forth, to carry out the function.

The BMC (baseboard management controller) 138 can be a specialized microcontroller or processor on the system 100. In some cases, the BMC 138 can be part of an Intelligent Platform Management Interface (IPMI). Moreover, in some cases, the BMC 138 can be embedded on a motherboard or main circuit board of the system 100. The BMC 138 can manage the interface between system management software and platform hardware. Different types of sensors built into the system 100 can report to the BMC 138 on parameters such as temperature, cooling fan speeds, power status, operating system (OS) status, and so forth. The BMC 138 can monitor the sensors and send alerts to an administrator via a network interface, such as communication interface 140, if any of the parameters do not stay within preset limits or thresholds, indicating a potential failure or error of the system 100. The administrator can also remotely communicate with the BMC 138 to take some corrective action, such as resetting or power cycling the system 100 to restore functionality.

Flash memory 142 can be an electronic non-volatile computer storage medium or chip which can be used by the system 100 for storage and/or data transfer. The flash memory 142 can be electrically erased and/or reprogrammed. Flash memory 142 can include, for example, erasable programmable read-only memory (EPROM), electrically erasable programmable read-only memory (EEPROM), ROM, NVRAM, or complementary metal-oxide semiconductor (CMOS). The flash memory 142 can store the firmware 148 executed by the system 100 when the system 100 is first powered on, along with a set of configurations specified for the firmware 148. The flash memory 142 can also store configurations used by the firmware 148.

The firmware 148 can include a Basic Input/Output System or its successors or equivalents, such as an Extensible Firmware Interface (EFI) or Unified Extensible Firmware Interface (UEFI). The firmware 148 can be loaded and executed as a sequence program each time the system 100 is started. The firmware 148 can recognize, initialize, and test hardware present in the system 100 based on the set of configurations. The firmware 148 can perform a self-test, such as a Power-on-Self-Test (POST), on the system 100. This self-test can test functionality of various hardware components such as hard disk drives, optical reading devices, cooling devices, memory modules, expansion cards and the like. The firmware 148 can address and allocate an area in the memory 115, ROM 120, RAM 125, and/or storage device 130, to store an operating system (OS). The firmware 148 can load a boot loader and/or OS, and give control of the system 100 to the OS.

The firmware 148 of the system 100 can include a firmware configuration that defines how the firmware 148 controls various hardware components in the system 100. The firmware configuration can determine the order in which the various hardware components in the system 100 are started. The firmware 148 can provide an interface, such as an UEFI, that allows a variety of different parameters to be set, which can be different from parameters in a firmware default configuration. For example, a user (e.g., an administrator) can use the firmware 148 to specify clock and bus speeds, define what peripherals are attached to the system 100, set monitoring of health (e.g., fan speeds and CPU temperature limits), and/or provide a variety of other parameters that affect overall performance and power usage of the system 100.

While firmware 148 is illustrated as being stored in the flash memory 142, one of ordinary skill in the art will readily recognize that the firmware 148 can be stored in other memory components, such as memory 115 or ROM 120, for example. However, firmware 148 is illustrated as being stored in the flash memory 142 as a non-limiting example for explanation purposes.

FIG. 1B illustrates an example computer system 150 having a chipset architecture that can be used in executing the described method(s) or operations, and generating and displaying a graphical user interface (GUI). Computer system 150 can include computer hardware, software, and firmware that can be used to implement the disclosed technology. System 150 can include a processor 155, representative of any number of physically and/or logically distinct resources capable of executing software, firmware, and hardware configured to perform identified computations. Processor 155 can communicate with a chipset 160 that can control input to and output from processor 155. In this example, chipset 160 outputs information to output device 165, such as a display, and can read and write information to storage device 170, which can include magnetic media, and solid state media, for example. Chipset 160 can also read data from and write data to RAM 175. A bridge 180 for interfacing with a variety of user interface components 185 can be provided for interfacing with chipset 160. Such user interface components 185 can include a keyboard, a microphone, touch detection and processing circuitry, a pointing device, such as a mouse, and so on. In general, inputs to system 150 can come from any of a variety of sources, machine generated and/or human generated.

Chipset 160 can also interface with one or more communication interfaces 190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 155 analyzing data stored in storage 170 or 175. Further, the machine can receive inputs from a user via user interface components 185 and execute appropriate functions, such as browsing functions by interpreting these inputs using processor 155.

Moreover, chipset 160 can also communicate with firmware 195, which can be executed by the computer system 150 when powering on. The firmware 195 can recognize, initialize, and test hardware present in the computer system 150 based on a set of firmware configurations. The firmware 195 can perform a self-test, such as a POST, on the system 150. The self-test can test functionality of the various hardware components 155-190. The firmware 195 can address and allocate an area in the memory 175 to store an OS. The firmware 195 can load a boot loader and/or OS, and give control of the system 150 to the OS. In some cases, the firmware 195 can communicate with the hardware components 155-190. Here, the firmware 195 can communicate with the hardware components 155 and 165-190 through the chipset 160 and/or through one or more other components. In some cases, the firmware 195 can communicate directly with the hardware components 155-190.

It can be appreciated that example systems 100 and 150 can have more than one processor 110 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, servers, network devices, and so forth. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described herein.

Figure 2:
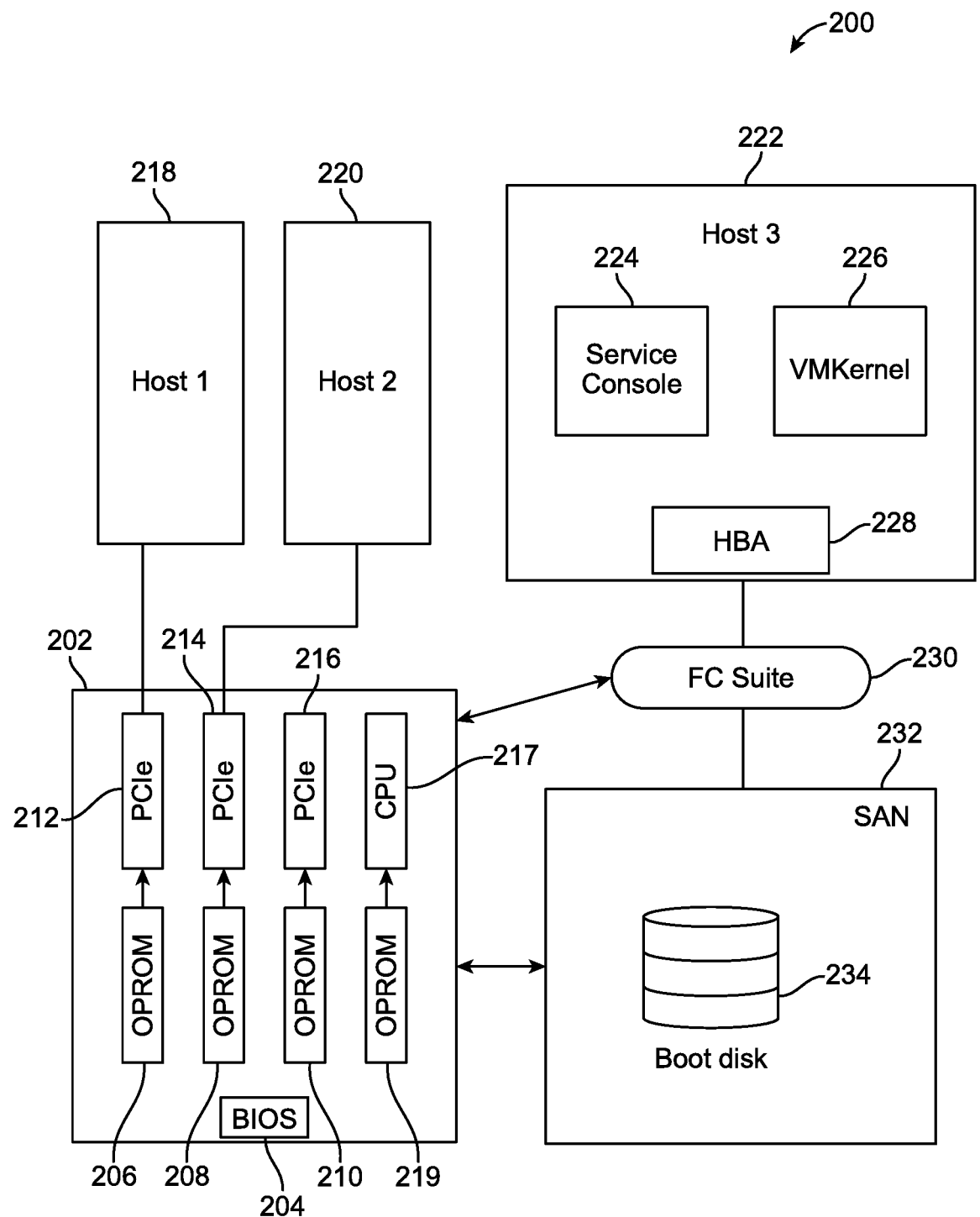
FIG. 2 illustrates a block diagram of an example environment executing parallel boot of activities in a SAN booting context.

FIG. 2 illustrates a boot from SAN scenario with multiple PCIe-based adapters. For example, the overall network 200 includes a server 202 that has by way of example three PCIe adapters 212, 214, 216 configured therein. Each respective adapter has a respective OPROM 206, 208, 210 which will initiate the execution of each of these adapters. As noted above, the traditional approach to initialize each adapter is sequential.

By way of example, one PCIe adapter 212 communicates with a first host 218, a second PCIe adapter communicates with a second host 220 and a third PCIe adapter 216 communicates through a switch 230 with a third host 222. Shown in the host 222 are various components such as a service counsel 224, a VMKernel 226 and an HBA Component 228. Also shown is a SAN 232 with a boot disk 234. A CPU 217 is also shown with a corresponding OPROM 219. It is noted that the various adapters (212, 214, 216) and CPU 217 represent examples of the various devices within the system 202 that are bootable devices. These represent any devices, adapters, CPUs, GPUs, CPU cores, CPU domain to PCI, storage devices, HBA device, Fiber Channel device, and/or any other device that needs to be booted as part of the initialization of the overall system. The respective device reports its type to the system during the initial phase.

As noted above, for a computing a networking platform, the initialization of I/O and networking adapters happens in a sequence and takes much longer to boot each adapter separately. Along with the delay time to boot, there are also error conditions and retries for each respective adapter initialization that can make the platform boot take even longer. The number of adapters present in the system increases the boot time linearly. For example, one platform may have 2 slots in a server for adapters which would require 5-6 minutes to boot. Another platform may have 10 slots which would require 30-40 minutes to boot.

Proposed herein is a mechanism for accelerating the booting observers and other network devices by doing a pre-initialization of the co-processors. The process includes creating an affinity table, checking a type of boot operation and executing boot of activities in parallel so that the boot time remains constant no matter how many adapters are present. In general, the boot time will thereby be approximately the same amount of time it takes to boot a single adapter rather than a linear increase of the time based on the number of adapters in the system.

One challenge with the traditional approach to booting multiple adapters is that when the computing device 202 boots up, it has to load the OPROM (206, 208, 210) for all devices (212, 214, 216) that are set as bootable devices, before actually booting each device based on a boot order. The present approach addresses this issue. After a platform initialization phase, and a CPU, memory, and PCI scan is completed, based on the number of CPUs and the number of I/O and other PCIe adapter OPROMS, the system initiates a parallel launch of adapter OPROM execution on the different cores/CPUs in an efficient way.

Figure 3:
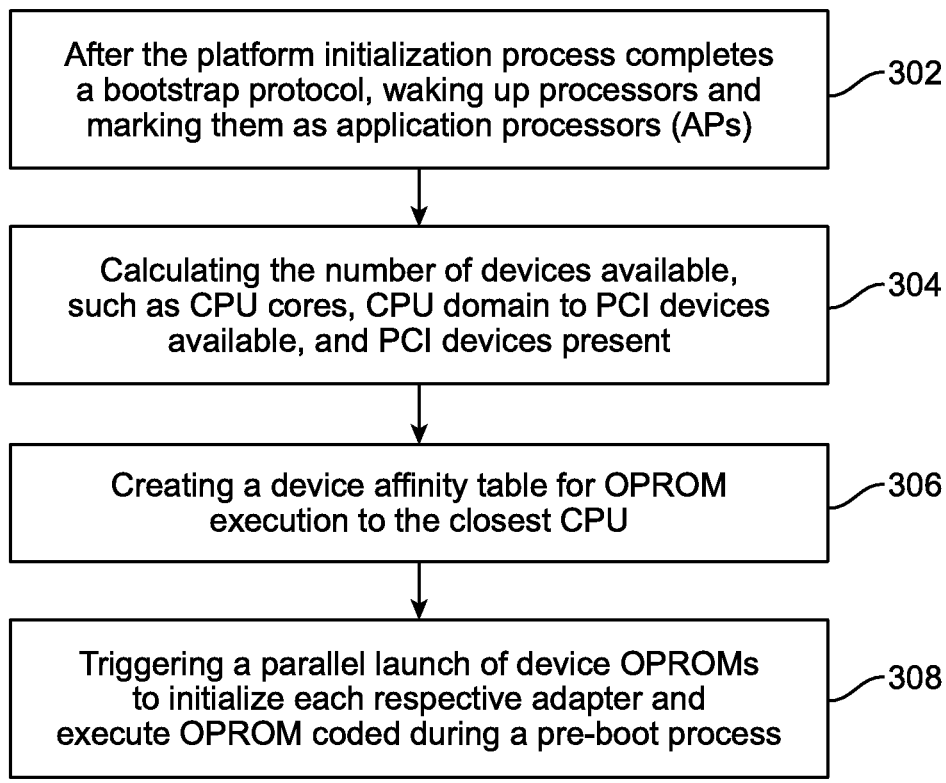
FIG. 3 illustrates method embodiment.

The process proceeds as follows with the basic steps shown in FIG. 3. After the platform initialization process completes a bootstrap protocol, the CPU wakes up other processors and marks them as application processors (APs) (302). The system calculates the number of devices available, such as CPU cores, CPU domain to PCI devices available, and PCI devices present (304). The system creates a device affinity table to OPROM execution to the closest CPU (306). For example, slot-5 in the system 202 connected to CPU2 gets to launch the OPROM of the slot-5 card and the slot-1 adapter OPROM gets to execute to CPU1, etc. The following is an example affinity table which includes some reference to card slots, CPUsocket/core affinities, card/device type, a dependency parameter and flags. The flags can relate to any number parameter such as a flag related to a state change, a re-boot flag, an affinity flag, and/or a time delay flag.

TABLE 1

| Card Slot | CPuSocket/Core Affinity | Card Type | Dependency | Flags |
|---|---|---|---|---|
| 1 | Socket 1, Core 10 (dynamic) | Storage | 0 | 0 State Change: Reboot flag: |
| MEZZ | Socket 1, Core 2 (dynamic) | Fiber Channel | 0 | 0 State Change: Reboot flag: |
| 5 | Socket 2, Core 30 | Network | 1 | Affinity: 1, 2 Time delay: 0 State Change: Reboot flag: |

The process of parallelization of the execution of the various devices occurs after the initial boot and initialization of one or more CPUs such that the system can identify which respective devices are connected to which respective CPU or CPUs and then run the parallelization process described herein.

The system next triggers a parallel launch of device OPROMs to initialize each respective adapter and execute OPROM coded during a pre-boot process (308). If there is any dependency between multiple adapters, the system will address such dependency with dependency tags as noted in table 1. The dependency tags can cause particular devices to be launched in a particular order. It is noted, that launching in a particular order, however, can also mean that they are launched sequentially but that part of the launch or initialization process can occur in parallel. For example, if it takes 2 minutes for a first network adapter to boot and 2 minutes for a second network adapter to boot, if there is a dependency between the first network adapter and the second network adapter, such that they need to be executed sequentially, the time delay flag can control the timing of the sequential execution. For example, if the first network adapter begins booting at 10:00 AM, in the second network adapter begins booting at 10:00 AM and 15 seconds, there will be parallel booting or executing operations for one minute and 45 seconds between the first network adapter and the second network adapter. A dependency of 0 indicates no dependency and the flag is set to 1 if there is a dependency for that device. Where a dependency exists, as in the device in slot 5 of table 1, then the affinity flag (or other flag) can be set to identify which other device should be initiated before the respective device having the dependency. A time delay, if needed to be defined, can be included as well.

This process reduces the boot time to around 2-3 minutes per adapter (or the maximum time for the OPROM) for any platform no matter how many adapters are present in the system.

As noted above, examples of the specific boot flags can include a first time boot, an upgrade boot, a regular reboot and so forth. These different parameters can help the system initialize the OPROM hardware state without additional retries if there is no change in the earlier state. The implementation of processes associated with these flags can be with a BIOS launching interrupt with a parameter to the I/O OPROM.

I/O adapter dependencies in case of paired adapters like GPUs or hardware load balancers can include an additional dependency list of slots which can be established and executed within the same CPU or where the time delay parameter between them. The process is described herein and can also be applied to any device that has sequential initialization of ports or adapter launches. For example, switches and routers can also be devices that can be initialized according to the principles described herein. These can include, for example, switches and the Cisco Catalyst switch family or the ISR (Integrated Services Routers) router family.

This process can help significantly speed up the boot of sequence and driver initialization process using the parallel executions principles. This will overall improve the boot of time and user experience with on boarding a new device.

Figure 4:
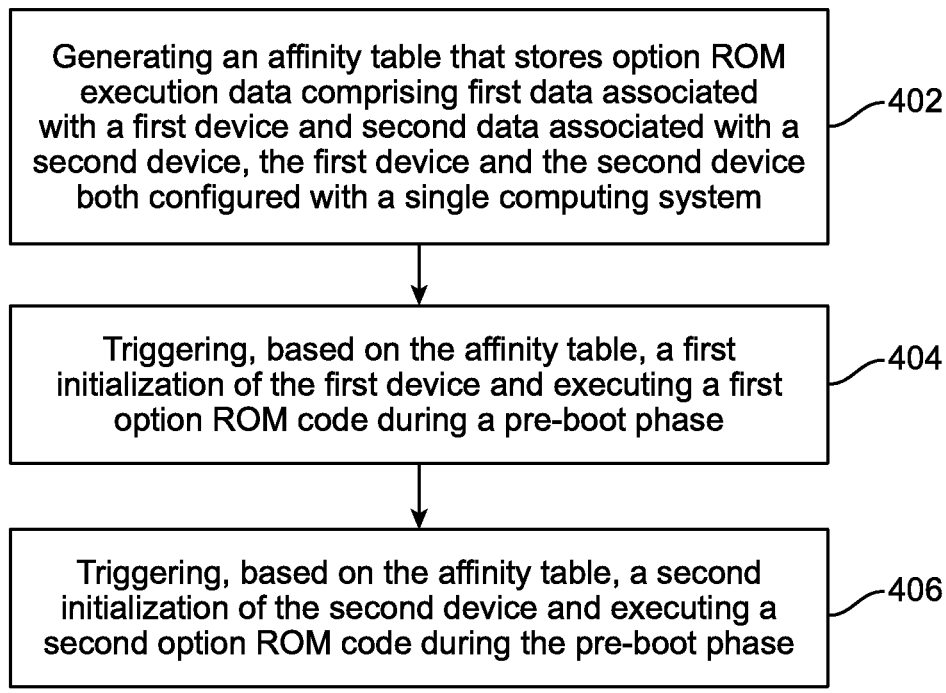
FIG. 4 illustrates another method embodiment.

FIG. 4 illustrates another method embodiment. A method includes generating an affinity table that stores option ROM execution data comprising first data associated with a first device and second data associated with a second device, the first device and the second device both configured with a single computing system (402), triggering, based on the affinity table, a first initialization of the first device and executing a first option ROM code during a pre-boot phase (404) and triggering, based on the affinity table, a second initialization of the second device and executing a second option ROM code during the pre-boot phase (406). Triggering the first initialization of the first device and triggering the second initialization of the second device during the pre-boot phase can be performed such that at least a part of the first initialization of the first device and at least part of the second initialization of the second device are executed in parallel.

The first device can include a first adapter and the second device can include a second adapter. The affinity table can include at least one or more of: a card slot for each device, a CPU socket parameter for each device, a core affinity parameter for each device, a device type for each device, a dependency parameter, a state change flag, a reboot flag, a time delay flag, an upgrade boot flag, a first time boot flag, and an affinity flag. In one aspect, the first initialization of the first device and the second initialization of the second device can be initiated either (1) simultaneously or (2) sequentially based on one or more of a dependency parameter and/or a time delay flag.

Triggering the first initialization of the first device and triggering the second initialization of the second device can occur based at least in part on a physical distance between the first device and a first CPU and the second device and a second CPU. The first CPU and the second CPU can in one aspect be the same CPU.

In another aspect, the method can further include triggering the first device and the second device sequentially based on one or more of the dependency, an identified time delay, a dynamic value, a manually programmed value, a value dependent upon historical data of how long booting takes for a respective device, a predicted value from a machine learning engine, a time of day, an amount of energy used to boot devices, a current cost of the energy used to boot respective devices, predicted workload which will utilize respective devices, a scheduled time, a service level agreement, and a priority of a user, a workload or an entity.

In another aspect, triggering the first device and the second device sequentially can be further performed based at least in part on the time delay, which can be fixed in the table or dynamic based on any number of parameters such as time of day, energy usage, service level agreements, priorities, and so forth. In one aspect, local interest resources and memory are allocated to a CPU that is closest to the first device and the second device.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, servers, network devices and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

We claim:
1. A method comprising:
generating an affinity table that stores option ROM execution data comprising first option ROM execution data associated with a first device, second option ROM execution data associated with a second device and dependency data, wherein the first option ROM execution data includes at least a first parameter of a closest computer processing unit (CPU) to execute a first option ROM code and the second option ROM execution data includes at least a second parameter of a closest CPU to execute a second option ROM code;
triggering, based on the first option ROM execution data of the affinity table, a first initialization of the first device and executing the first option ROM code during a pre-boot phase; and
triggering, based on the second option ROM execution data of the affinity table, a second initialization of the second device and executing the second option ROM code during the pre-boot phase, wherein triggering the first initialization of the first device and triggering the second initialization of the second device during the pre-boot phase is performed such that at least a part of the first initialization of the first device and at least part of the second initialization of the second device are executed in parallel and in an order related to the dependency data.

2. The method of claim 1, wherein the first device comprises a first adapter and the second device comprises a second adapter.

3. The method of claim 1, wherein the affinity table comprises at least one or more of:
a card slot for each device, a CPU socket parameter for each device, a core affinity parameter for each device, a device type for each device a state change flag, a reboot flag, a time delay flag, an upgrade boot flag, a first time boot flag, and an affinity flag.

4. The method of claim 1, wherein the first initialization of the first device and the second initialization of the second device are initiated either (1) simultaneously or (2) sequentially based on one or more of the dependency data or a time delay flag.

5. The method of claim 1, wherein the first device comprises one of a switch, a router, an I/O adapter, a server, a desktop computer, a network device, and a network adapter.

6. The method of claim 1, wherein triggering the first initialization of the first device and triggering the second initialization of the second device occurs based at least in part on a physical distance between the first device and a first CPU and the second device and a second CPU.

7. The method of claim 1, wherein the dependency data includes that a dependency exists between the first device and the second device.

8. The method of claim 7, further comprising:
triggering the first device and the second device sequentially based on the dependency.

9. The method of claim 8, wherein triggering the first device and the second device sequentially is further performed based at least in part on a time delay.

10. The method of claim 7, wherein local interest resources and memory are allocated to a CPU that is closest to the first device and the second device.

11. A system comprising:
a processor; and
a computer-readable storage medium having stored therein instructions which, when executed by the processor, cause the processor to perform operations comprising: generating an affinity table that stores option ROM execution data comprising first option ROM execution data associated with a first device, second option ROM execution data associated with a second device, and dependency data, wherein the first option ROM execution data includes at least a first parameter of a closest computer processing unit (CPU) to execute a first option ROM code and the second option ROM execution data includes at least a second parameter of a closest CPU to execute a second option ROM code;
triggering, based on the first option ROM execution data of the affinity table, a first initialization of the first device and executing the first option ROM code during a pre-boot phase; and
triggering, based on the second option ROM execution data of the affinity table, a second initialization of the second device and executing the second option ROM code during the pre-boot phase, wherein triggering the first initialization of the first device and triggering the second initialization of the second device during the pre-boot phase is performed such that at least a part of the first initialization of the first device and at least part of the second initialization of the second device are executed in parallel and in an order related to the dependency data.

12. The system of claim 11, wherein the first device comprises a first adapter and the second device comprises a second adapter.

13. The system of claim 11, wherein the affinity table comprises at least one or more of: a card slot for each device, a CPU socket parameter for each device, a core affinity parameter for each device, a device type for each device a state change flag, a reboot flag, a time delay flag, an upgrade boot flag, a first time boot flag, and an affinity flag.

14. The system of claim 11, wherein the first initialization of the first device and the second initialization of the second device are initiated either (1) simultaneously or (2) sequentially based on one or more of the dependency data or a time delay flag.

15. The system of claim 11, wherein the first device comprises one of a switch, a router, an I/O adapter, a server, a desktop computer, a network device, and a network adapter.

16. The system of claim 11, wherein triggering the first initialization of the first device and triggering the second initialization of the second device occurs based at least in part on a physical distance between the first device and a first CPU and the second device and a second CPU.

17. The system of claim 11, wherein the dependency data includes that a dependency exists between the first device and the second device.

18. The system of claim 17, further comprising:
triggering the first device and the second device sequentially based on the dependency.

19. The system of claim 18, wherein triggering the first device and the second device sequentially is further performed based at least in part on a time delay.

20. A non-transitory computer-readable storage medium having stored therein instructions which, when executed by a processor, cause the processor to perform operations comprising:
generating an affinity table that stores option ROM execution data comprising first option ROM execution data associated with a first device, second option ROM execution data associated with a second device and dependency data, wherein the first option ROM execution data includes at least a first parameter of a closest computer processing unit (CPU) to execute a first option ROM code and the second option ROM execution data includes at least a second parameter of a closest CPU to execute a second option ROM code
triggering, based on the first option ROM execution data of the affinity table, a first initialization of the first device and executing the first option ROM code during a pre-boot phase; and
triggering, based on the second option ROM execution data of the affinity table, a second initialization of the second device and executing the second option ROM code during the pre-boot phase, wherein triggering the first initialization of the first device and triggering the second initialization of the second device during the pre-boot phase is performed such that at least a part of the first initialization of the first device and at least part of the second initialization of the second device are executed in parallel and in an order related to the dependency data.

* * * * *